(12) United States Patent
Chan et al.

(10) Patent No.: US 11,743,678 B2
(45) Date of Patent: Aug. 29, 2023

(54) GENERIC SIGNAL FUSION FRAMEWORK FOR MULTI-MODAL LOCALIZATION

(71) Applicant: The Hong Kong University of Science and Technology, Hong Kong (CN)

(72) Inventors: Shueng Han Gary Chan, Hong Kong (CN); Man Yu Wong, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 182 days.

(21) Appl. No.: 17/344,998

(22) Filed: Jun. 11, 2021

(65) Prior Publication Data

US 2022/0060845 A1 Feb. 24, 2022

Related U.S. Application Data

(60) Provisional application No. 63/103,770, filed on Aug. 24, 2020.

(51) Int. Cl.
| | |
|---|---|
| *H04W 4/021* | (2018.01) |
| *H04W 4/029* | (2018.01) |
| *H04B 17/318* | (2015.01) |
| *H04W 64/00* | (2009.01) |

(52) U.S. Cl.
CPC ......... *H04W 4/021* (2013.01); *H04B 17/318* (2015.01); *H04W 4/029* (2018.02); *H04W 64/006* (2013.01)

(58) Field of Classification Search
CPC ... H04W 4/021; H04W 4/029; H04W 64/006; H04W 4/80; H04B 17/318; G01S 5/0252
See application file for complete search history.

(56) References Cited

U.S. PATENT DOCUMENTS

2015/0005029 A1* 1/2015 Medapalli ......... H04W 56/0035
455/552.1

OTHER PUBLICATIONS

Fang, S.H. and Lin, T.N., 2010. Cooperative multi-radio localization in heterogeneous wireless networks. IEEE Transactions on Wireless Communications, 9(5), pp. 1547-1551.*

(Continued)

*Primary Examiner* — Zhitong Chen
(74) *Attorney, Agent, or Firm* — Idea Intellectual Limited; Margaret A. Burke; Sam T. Yip

(57) ABSTRACT

The present invention provides a signal fusion system that is a probabilistic system fusing an arbitrary combination of heterogeneous signals for determining the location of electronic devices. The system includes a signal sampling device for detecting one or more signals emitted by an electronic device to be located, including geolocation signals, WiFi signals, Bluetooth signals, 4G communication signals, 5G communication signals, geomagnetism signals, or inertial navigation system signals (INS). A likelihood processor cooperates with the signal sampling device to receive information about selected sampled signals, and creates a grid of reference points for an interested area in which the electronic device may be located. The likelihood processor independently computes, for each selected sampled signal, a location likelihood that is a probability of observing the sampled signal given that the electronic device is located at different reference points in the grid.

8 Claims, 11 Drawing Sheets

(56) References Cited

OTHER PUBLICATIONS

Evennou, F. and Marx, F., 2006. Advanced integration of WiFi and inertial navigation systems for indoor mobile positioning. EURASIP Journal on Advances in Signal Processing, 2006, pp. 1-11.*

Zafari, F., Gkelias, A. and Leung, K.K., 2019. A survey of indoor localization systems and technologies. IEEE Communications Surveys & Tutorials, 21(3), pp. 2568-2599.*

Sand, S., Mensing, C., Ma, Y., Tafazolli, R., Yin, X., Figueiras, J., Nielsen, J. and Fleury, B.H., Sep. 2008. Hybrid data fusion and cooperative schemes for wireless positioning. In 2008 IEEE 68th Vehicular Technology Conference (pp. 1-5). IEEE.*

Ko, M.H., West, G., Venkatesh, S. and Kumar, M., 2008. Using dynamic time warping for online temporal fusion in multisensor systems. Information Fusion, 9(3), pp. 370-388.*

\* cited by examiner

GENERIC SIGNAL FUSION FRAMEWORK FOR MULTI-MODAL LOCALIZATION

FIELD OF THE INVENTION

The present invention generally relates to localization techniques for determining the position of electronic devices/users of electronic devices. More particularly, the present invention relates to a probabilistic system fusing an arbitrary combination of heterogeneous signals for determining the location of electronic devices.

BACKGROUND OF THE INVENTION

Localization technology has wide range of applications in navigation, location-based marketing, geo-fencing, etc. For open outdoor environments, GPS usually provides an acceptable solution. However, in urban-canyon, semi-indoor or deep indoor settings, GPS accuracy deteriorates due to weak or unavailable signals. For complex indoor cases, fingerprinting emerges as a promising technique for localization. In fingerprinting, a site is first surveyed to label detected signal values with their locations, the so-called "fingerprints." Given the fingerprints, a user location can be estimated based on the signals that are sampled. Various fingerprinting signals have been considered, such as WiFi, Bluetooth, magnetic field-based signals, etc. Each signal category has its own strengths and limitations. For example, GPS works reasonably well outdoors but may be unavailable indoors. Radio-frequency (RF) signals such as WiFi or Bluetooth are pervasive and differentiable over a long range, leading to its deployability in an indoor environment. However, due to multi-path and fading effects, RF signals generally suffer from relatively high noise. The localization accuracy also depends considerably on the strength and density of the signals. For some signals such as WiFi, their sampling rate in mobile devices such as phones may be infrequent (once every tens of seconds), which adversely affects user experience. Geomagnetism is another signal category that has been explored. Its strengths are its omnipresence (no additional infrastructure), fast sampling rate (tens of samples per second) and low noise. Its drawback is global ambiguity where a certain geomagnetic sequence may be matched to multiple places in the area of interest for localization.

Inertial sensors are available in almost every mobile device, and may be used to provide user movement information. However, inertial sensor information only provides relative location information and errors may accumulate and diverge over time. As a result, INS is often combined with other signals to enhance localization accuracy.

In view of the complementarity of the various signals used for localization, recent research has been focusing on fusing different signals to combine their strengths while mitigating their weaknesses. However, fusion techniques have considered only two or three signals combined in a highly specialized and customized manner according to the specific signal characteristics. As a result, extending the fusion techniques to include other signals is typically not possible. While signals for a given technique are often assumed to be fully available at the time of a localization decision, in reality, due to widely different signal sampling rates, missing signal values occur. Attempts to compensate for missing signal values include using the last measured signal values, making predictions based on history, or reducing the localization frequency to the slowest sampling rate. None of these compensation techniques are satisfactory.

Thus, there is a need in the art for a generic signal fusion framework for multi-modal localization systems and methods.

SUMMARY OF THE INVENTION

The present invention overcomes the problems of prior art systems by supporting signal addition and removal at any time. It is a platform incrementally extensible to new signals without the need for retraining the whole system.

The present invention provides a signal fusion system and method termed "SiFu." The SiFu system is a probabilistic system fusing an arbitrary combination of heterogeneous signals for determining the location of electronic devices. The system includes a signal sampling device for detecting one or more signals emitted by an electronic device to be located, including geolocation signals, WiFi signals, Bluetooth signals, 4G communication signals, 5G communication signals, geomagnetism signals, or inertial navigation system signals (INS). The signal sampling device uses heterogeneous sampling rates for each of the selected signals.

A likelihood processor cooperates with the signal sampling device to receive information about selected sampled signals, and creates a grid of reference points for an interested area in which the electronic device may be located. The likelihood processor independently computes, for each selected sampled signal, a location likelihood that is a probability of observing the sampled signal given that the electronic device is located at different reference points in the grid. The location likelihoods are combined in a weighted fashion in a fusion module.

A particle filter uses the location likelihood to update a particle weight in the particle filter to determine the location of the electronic device.

The likelihood processor may include various modules for determining the likelihoods of different types of signals. For example, a neural network module may be used for RSSI vectors (e.g., Bluetooth, WiFi). A Bayesian analysis module may be used for determining the likelihood of geolocation signals. A dynamic time warping module may be used for the analysis of sequence-based signals (magnetic field-based signals).

BRIEF DESCRIPTION OF THE DRAWINGS

Aspects of the present disclosure are readily understood from the following detailed description when read with the accompanying figures.

DETAILED DESCRIPTION

Figure 1A:
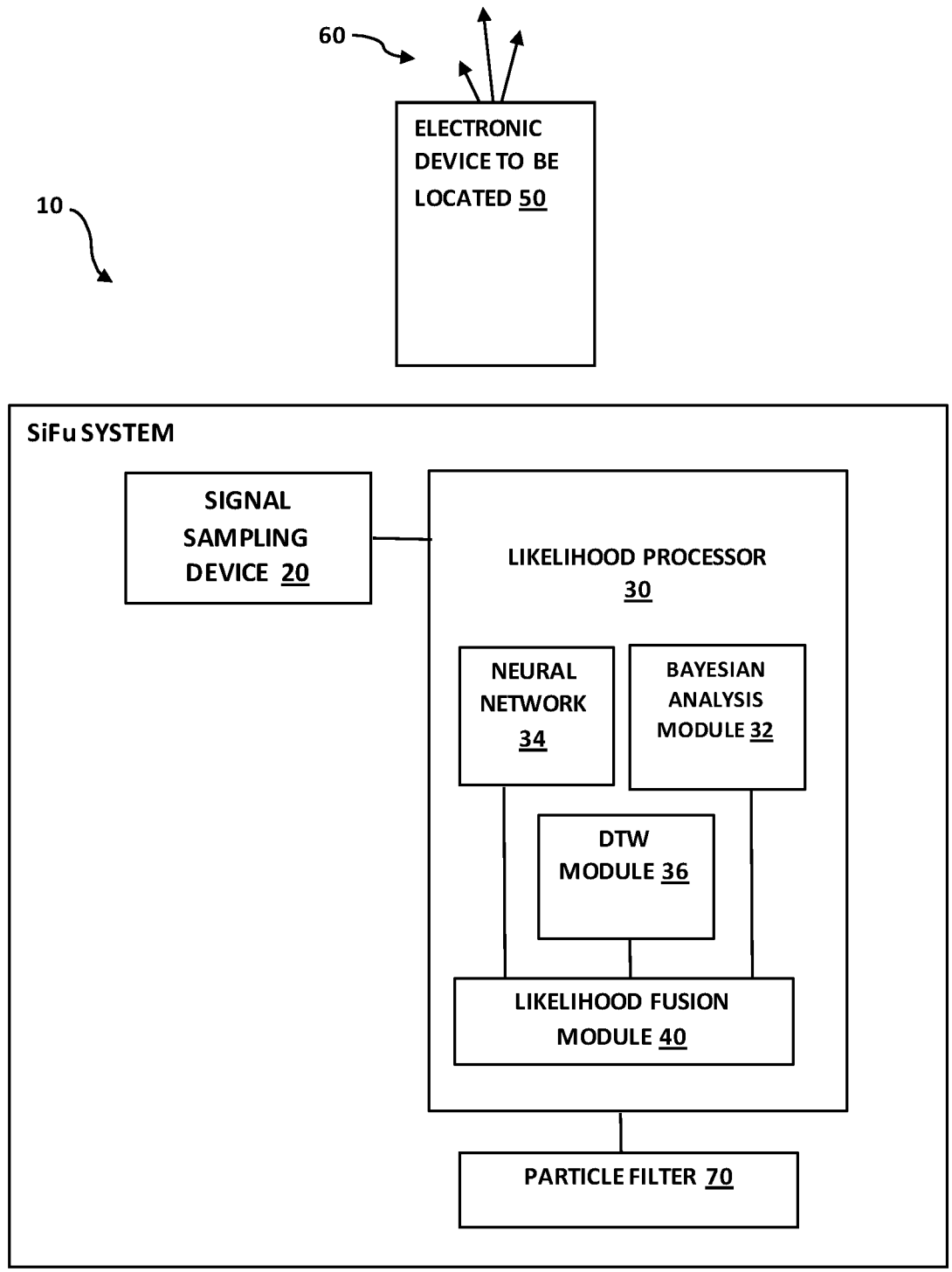
FIGS. 1A and 1B schematically depict the SiFu system and method of the present disclosure.

Turning to the drawings in detail, FIG. 1A illustrates a signal fusion (SiFu) system. The signal fusion system is termed "SiFu." The SiFu system is a probabilistic system fusing an arbitrary combination of heterogeneous signals for determining the location of electronic devices. As seen in FIG. 1A the system 10 includes a signal sampling device 20 for detecting one or more signals 60 emanating from an electronic device 50 to be located, including geolocation signals, WiFi signals, Bluetooth signals, 4G communication signals, 5G communication signals, geomagnetism signals, or inertial navigation system signals (INS). The signal sampling device uses heterogeneous sampling rates for each of the selected signals 60. The signal sampling device may be selected from receivers, transceivers, mobile phones, smart watches and IOT devices.

A likelihood processor 30 cooperates with the signal sampling device 20 to receive information about selected sampled signals, and creates a grid of reference points for an interested area in which the electronic device 50 may be located. The likelihood processor independently computes, for each selected sampled signal, a location likelihood that is a probability of observing the sampled signal given that the electronic device 50 is located at different reference points in the grid.

The likelihood processor may include various modules for determining the likelihoods of different types of signals. For example, a neural network module 34 may be used for RSSI vectors (e.g., Bluetooth, WiFi). A Bayesian analysis module 32 may be used for determining the likelihood of geolocation signals. A dynamic time warping module 36 may be used for the analysis of sequence-based signals (magnetic field-based signals).

The independently computed likelihoods are fused in a weighted fashion in a likelihood fusion module 40, which assigns weights according to the individual model performance at each grid point in the training process of the fingerprints.

A particle filter 70 uses the location likelihood to update a particle weight in the particle filter 70 to determine the location of the electronic device.

Figure 1B:
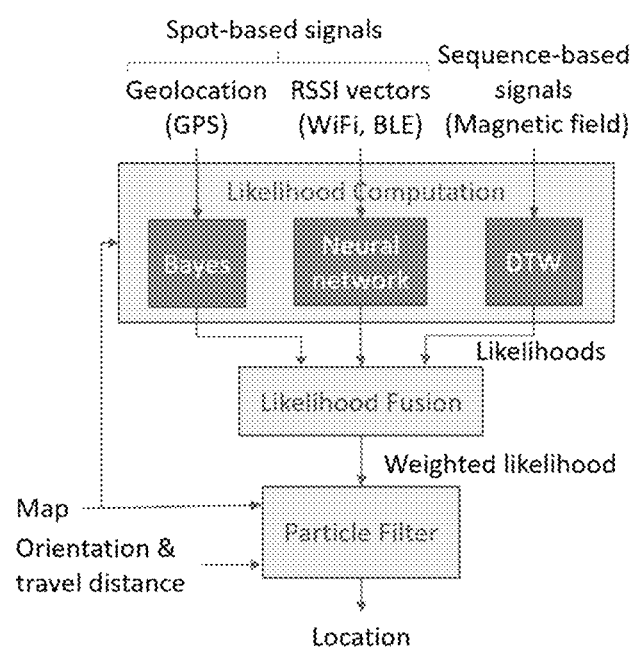

SiFu adopts a probabilistic framework as illustrated in FIG. 1B. It considers various classes of signals depending on how they are processed for localization. For example, sequence-based signals base localization on a group of consecutive signal samples (e.g., magnetic field), and spot-based signals base localization on a single sample. Spot-based signals are further sub-divided into a first group in which the signal input is already in the form of global latitude and longitude coordinates (e.g., GPS or Beidou), and a second group which use a vector of received signal strength indicators (RSSIs). The second group includes signals such as WiFi and Bluetooth.

In operation, the signal sampling device 20 samples one or more signals emitted from the electronic device to be located 50. A sampled signal is fed into a likelihood processor 30 from the signal sampling device, which independently converts the signal value into a location likelihood on pre-defined grids in a feasible area of a map relating to a potential device location. The Bayesian module 32 converts the global coordinates and accuracy to a likelihood on the pre-defined grids. For a signal strength vector, the neural network module 34 returns the likelihood by vector comparison using a neural network, discussed in more detail below. For sequence-based signals, the dynamic time warping module 36 estimates the likelihood through matching the input sequence against fingerprints on the grid points. Note that the likelihood computation modules 32, 34, and 36 are generic, i.e., they are applicable to different signal types within a class. As such, the three modules are capable of dynamically analyzing various groups of signals, making the system capable of adding or dropping a category of signals to be analyzed based on current conditions. Normally, a signal is dynamically dropped when it is not observed at the localization time. This can happen because signal sampling rates are different for different signals and also due to limited signal coverage. Similarly, a signal may be dynamically added when it is observed again. The ability to dynamically add and drop signals is a considerable strength of the present invention, making it able to adapt to different signal conditions and adapt to different environments/surroundings.

The independently computed likelihoods are fused in a weighted fashion in the likelihood fusion module 40. The weighted likelihood is then integrated with user movement information (as obtained from INS) using the particle filter 70, with feasible areas of the map as a constraint.

Because the SiFu system uses a probabilistic framework fusing an arbitrary combination of heterogeneous signals the system 10 accommodates the presence or absence of signals due to different signal sampling rates, signal addition, signal removal, missed samples, etc. Therefore, system 10 achieves high elasticity and scalability in signal combination without the need for retraining and redesigning the system due to the changing signal environment.

RSSI vector comparison typically cannot cope with missing or non-overlapped signal values between two vectors seriously impacting localization accuracy. In the neural network module 34, a novel machine learning technique is used which employs a denoising autoencoder to learn the latent representation of signals in the area of interest for localization determination. In contrast to conventional approaches based on raw signal readings (e.g., cosine similarity or Euclidean distance), the SiFu system 10 estimates likelihood in the latent space. Because the deep features are learned from all fingerprint signals, the overcomes missing values problem is overcome, achieving higher robustness and accuracy.

Different signals may yield different localization accuracies at different locations in the interested area. The poor performance of system components may undermine the performance of the whole fusion localization system. Prior art approaches typically are customized for specific signals and hence, cannot add new signals into the system or drop previously-used signals. In the present invention, a weighted likelihood in Bayesian analysis is used to fuse multi-modal signals. Through a location-dependent weighting for each signal, signals are intelligently combined to achieve high accuracy.

Operation of the Likelihood Processor and its Modules

The area of interest is discretized into grids of reference points (RP). A localization likelihood, that is, the probability that a device to be localized is present at a reference point, is computed for each RP in the grid. Note that for signals using a fingerprinting approach, a fingerprint signal should be obtained at each RP. The symbols used in the following equations are defined below in

TABLE I

Major symbols in SiFu.

| Notation | Definition |
| --- | --- |
| S | A vector containing all observed signals |
| s | An observation of a particular signal type |
| x | The states in the interested area |
| d | Dimension of WiFi latent representation |
| L | Number of layers in WiFi encoder/decoder |
| $\sigma_w$ | The observation model parameter $\sigma$ for WiFi |
| $\sigma_m$ | The observation model parameter $\sigma$ for magnetic field |
| r | Magnetic matching range |
| $w_{ij}$ | The weight at RP i for signal j |
| N | Number of particles in particle filter |

Mathematically, the probability that the device is positioned at different locations given the observed signals, is denoted as p(x S), where x denotes the states (locations) in the interested area and $S=(s_1, \ldots, s_n)^T$ is a vector containing n observed signals.

The particle filter, which will be discussed in further detail below, is used to estimate this distribution. As such, the measurement likelihood p(S x) is determined for updating the weights of particles in the particle filter. Since different signals are sampled by different sensors, conditional independence among different signals is assumed.

The likelihood p(S|x) is given by $$p(S|x) = \overset{n}{p}(s_1, \ldots, s_n|x) = \prod_{i=1}^{n} p(s_i|x) \cdot p(S|x) = p(s_1, \ldots, s_n|x) = \prod_{i=1}^{n} p(s_i|x) \quad (1)$$

For every signal $s_i$, a measurement likelihood $p(s_i|x)$ is independently computed which is the probability of observing the sampled signal $s_i$ given the device is located at different RPs. This serves as the foundation for the generic fusion localization framework.

Geolocation data nay provide the global coordinates of the device in the format of [latitude, longitude, accuracy]. GPS and Google Fused Location API are two examples of this class of signal. While GPS is only available outdoors, Google API can locate devices virtually everywhere there is an Internet connection. In the two examples mentioned above, the reported accuracy is defined as the radius of 68% confidence, suggesting that there is a 68% probability that the true location is inside the circle centered at the reported location with radius equal to the reported accuracy. Also, note that alignment between map coordinate systems may be required.

This class of signal is modeled with a bivariate normal distribution characterized by a mean μ and covariance Σ. The mean vector is constructed using the reported location as $\mu=(\tilde{x}, \tilde{y})^T$, where $(\tilde{x}, \tilde{y})$ are the reported location in the local map coordinate system. The covariance matrix Σ of the distribution is approximated from the reported accuracy. With no prior knowledge, it is reasonable to assume that both dimensions of the Gaussian distribution are uncorrelated and have the same variance. Note that the (1 α) interval for a multivariate Gaussian distribution is given by:

$$(x-\mu)^T \Sigma^{-1} (x-\mu) \leq \chi_p^2(\alpha) \quad \text{Equation (2)}$$

where μ and Σ are the mean vector and covariance matrix of the Gaussian distribution $\chi_p^2(\alpha)$ is the $\alpha_p$ quantile of $\chi_p^2$.

As(x−μ) represents the difference between a point x and the mean μ, using the localization accuracy, we can obtain $$\sigma_x = \sigma_y = \frac{a}{\sqrt{2.27}},$$

where a is the accuracy reported. Hence, the covariance matrix $$\Sigma = \begin{bmatrix} \sigma_x & 0 \\ 0 & \sigma_y \end{bmatrix}$$

Then the measurement likelihood p(s x) is defined as given that locating at x, the probability of the mean being equal to the reported location. By Bayes' theorem:

$$p(s|x) = \frac{p(s)p(x|s)}{p(x)} \quad \text{Equation (3)}$$

A uniform prior for the mean is placed as it is equally probable everywhere, i.e., p(s) is constant. As p(x s) is the density function of Gaussian distribution, which can be computed with a known mean and covariance matrix, the likelihood is given by:

$$p(s|x) \propto p(x|s) = \frac{1}{2\pi\sqrt{|\Sigma|}} \exp\left(-\frac{1}{2}(x-\mu)^T \Sigma^{-1} (x-\mu)\right) \quad \text{Equation (4)}$$

RSSI Vector of Spot-Based Signals

For spot-based RSSI vectors, the likelihood computation at RP $x_i$ in the localization step obtains a similarity measure δ(s,t) between the sampled signal s and the fingerprint signal t at RP $x_i$. By assuming a normally-distributed observation model on the similarity measure, the probability of observing the RSSI vector s at the RP $x_i$ is obtained as:

$$p(s|x_i) = \frac{1}{\sqrt{(2\pi\sigma^2)}} e^{-\frac{\delta(s,t)}{2\sigma^2}} \quad \text{Equation (5)}$$

where σ is the standard deviation of the normal distribution, which is a parameter for the sensitivity of the observation model.

The similarity measure can sometimes be obtained by comparing raw readings. However, it is not good enough for signals of higher dimension where signal noise and missing features may severely mislead the similarity computation, and eventually the likelihood computation. Therefore, it is proposed to make use of the latent representation of signals to compute a similarity measure. The intuition is that the latent representation is the deep features learnt from all collected fingerprint signals in the interested area. Signal noise and missing measurements will be implicitly considered in the latent representation generation. Using such features is expected to give a more precise and robust similarity measure. The comparison between two RSSI vectors on a representation with a fixed dimension is also fairer. For localization purpose, it is expected that if the physical locations of two signals are close, their latent representations will also be similar.

Figure 2:
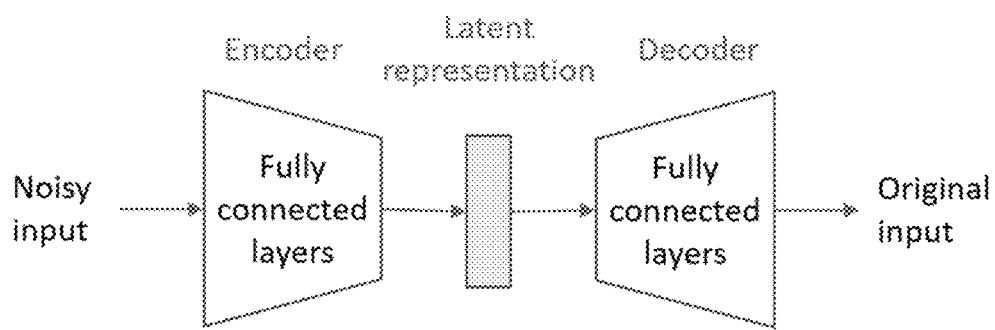
FIG. 2 is a schematic view of a denoising autoencoder.

Machine learning techniques are used to learn the signal latent representation. First, a denoising autoencoder is trained. FIG. 2 schematically depicts the structure of the autoencoder. The input is a noisy version of the fingerprint signals collected in the offline survey phase. Noise can be injected in the following two ways: (1) randomly masking features, which makes the model robust to the situation when some features are missing, and (2) adding Gaussian noise to simulate local measurement errors. The autoencoder includes an encoder that learns to encode the noisy signal into a latent representation of dimension d, as well as a decoder that recovers the original clean signal from the representation. In the autoencoder of FIG. 2, both encoders and decoders are made up of L fully connected layers.

Only one autoencoder is needed to learn from all fingerprints in the interested region, instead of one autoencoder specifically for one RP. Consequently, the method of the invention requires less effort regarding data collection and model training. Further, through learning to encode and decode the signals, similar signals in the whole localization region will generate similar latent representations, making it useful for signal differentiation for localization.

Figure 3:
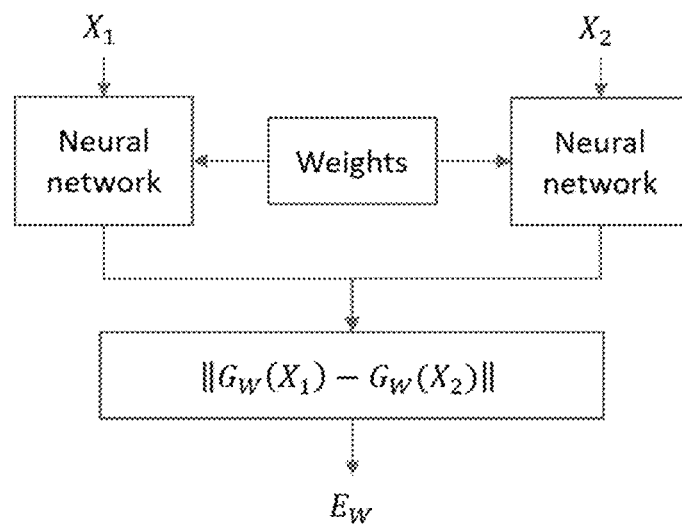
FIG. 3 is a schematic view of a dual neural network configuration.
Figure 4:
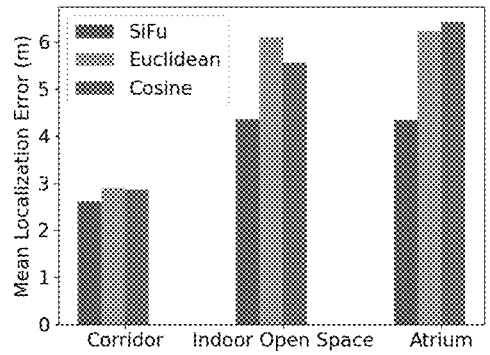
FIG. 4 is a plot of the mean error of different schemes for spot-based RSSI vectors in different locations.

With the denoising autoencoder, we use a Siamese/dual network depicted in FIG. 3 to compute the similarity measure. In this architecture, two networks share the same weight W on two different inputs $X_1$ and $X_2$. Given the sampled signal S and fingerprint signal t, the similarity measure is computed as:

$$\delta(s,t) = \|G_w(s) - G_w(t)\| \quad \text{Equation (6)}$$

where $G_w$ denotes the neural network with weight W. Here, the networks are essentially the encoder part of the autoencoder and the similarity measure computes the Euclidean distance between the latent representations of two RSSI vectors. A WiFi signal is taken as an example for this category of signals. WiFi RSSI readings are widely used in many fingerprint-based indoor localization systems. Because of signal attenuation during propagation, RSSI from each AP reflects how far the signal propagates in physical space from that AP. A WiFi RSSI vector, which consists of RSSI values from all detected APs at the moment, contains information rich enough to give a rough estimation of the device location. However, due to multipath and fading effects, WiFi signals are noisy in indoor environment and sometimes a few APs may not be detected. The denoising autoencoder addresses these problems and helps generate a better similarity measure.

Sequence-Based Signals

Due to differences in the signal sampling device sampling rate and device movement (for example, a user carrying a device having a certain walking speed), two sequences may not be aligned, making comparing two temporal sequences very difficult. To mitigate this issue, a dynamic time warping (DTW) algorithm is used which can stretch or compress the time dimension of sequences for optimal matching. The DTW algorithm finds an optimal warping path for two sequences S and t. In the warp path, data points in sequence s are associated with data points in sequence t. Finally, it returns the distance of the warp path as the sum of difference between data points in the warp path as:

$$\delta(s, t) = \sum_{k=1}^{n} |s_{ik} - t_{jk}| \quad \text{Equation (7)}$$

where sik and sjk are the k th data points on the warp path from the sequences s and t respectively.

The distance itself is a similarity measure, thus the likelihood is obtained based on a normally-distributed observation model as:

$$p(s|x_i) = \frac{1}{\sqrt{(2\pi\sigma^2)}} e^{-\frac{\delta(s,t)}{2\sigma^2}} \quad \text{Equation (8)}$$

Since a geomagnetic field reading is only a 3-dimensional vector, it usually cannot provide sufficient information for localization. For example, ambiguity is common where the magnetic field values at two very different locations are similar and this cannot be resolved easily. Hence, it is often necessary to consider multiple magnetic field readings within a period of time to predict device location. Therefore, magnetic field is selected as the representative of sequence-based signals.

As the complexity of the DTW algorithm is O(MN) where M and N are the lengths of the sequences respectively, the efficiency of the SiFu system is further improved by using fast DTW, a fast approximation of DTW that has linear time complexity. In addition, the last user location is used to limit the search space to speed up the matching process. The magnetic matching range denoted as r determines how large the magnetic matching space will be. Only the magnetic field fingerprints within r m from the last predicted location will be matched against the sampled signal for likelihood computation.

Likelihood Fusion

The independently computed likelihoods are combined into a joint likelihood in order to update the particle weight in the particle filter. Normally, this can be done using Eq. (1). Given the likelihoods, it only computes their product directly. However, these likelihoods may be inaccurate because of the model defects, producing an unreliable final result. To further address the vulnerability of the individual models, the present invention uses a weighted likelihood. In general, weighted likelihood, $L^{w_{ij}}$, is an approximation of Bayesian inference L. It is believed that weighted likelihood provides a good approximation to the posterior distribution with properly selected weights. In localization, signals may suffer from ambiguous readings and noise, thus it is possible to receive similar readings at two locations with far physical distance. Such signals can seriously affect the model training phase and consequently affect the performance of the model and the shape of likelihood function.

In the present invention, the weighted likelihood is adopted to avoid any negative influences due to poor model performance by spatially controlling the contribution of the signal to the likelihood. With a small weight, the signal will contribute less since low likelihood will be pushed closer to the high likelihood end. Discrimination between signals will be reduced. In the extreme case where the weight is 0, the weighted likelihood will become 1 no matter what the original likelihood is. In this case, the contribution of the signal is removed and the decision power is shifted to the other signals. In contrast, a signal with a high weight will have likelihood values useful for differentiating the location.

In this weighted scheme, weights, which indicate the wellness of the models, play an important role. Therefore, selection of weights is important for SiFu. Intuitively, signals with more distinguishable features should be assigned a higher weight, and vice versa. In SiFu, weights are inferred from the performance of models employing a fingerprint approach over all the area of interest. For signals that do not use a fingerprint approach, the invention assigns a weight of 1 so that the original likelihood function is preserved.

In SiFu, weights are location-specific because signal distinguishability may vary within the area of interest. Let $w_{ij}$ be the weight of signal type j at RP xi and Vij be the validation dataset consisting of the signals of type j collected there. To find $w_{ij}$ the localization performance is tested using a single signal source signal j on the validation dataset Vij. The localization error is computed as the Euclidean distance between ground truth and the predicted location. The weight is then computed through:

$$w_{ij} = 1 - \tilde{D}_i,$$

$$w_{ij} = 1 - \tilde{D}_l \quad (9)$$

where $\tilde{D}_l$ is normalized mean error at RP $x_i$.

The measurement likelihood of interest is approximated by:

$$\overset{m}{\underset{j=1}{p}}(s_1, \ldots, s_m | x_i) \overset{n}{=} p(s_j | x_i)^{w_{ij}} \cdot p(s_1, \ldots, s_m | x_i) = \prod_{j=1}^{m} p(s_j | x_i)^{w_{ij}} \quad (10)$$

Particle Filter

Upon obtaining the weighted likelihood, the particle filter 70 is used to combine the weighted likelihood with device (user) movement and information obtained from INS. Orientation and travel distance of the device are estimated from the readings of the gyroscope, magnetometer and accelerometer. A typical particle filter performs the following: 1) particle prediction, 2) weight update 3) location estimation, and 4) resampling.

The particle prediction step relies on the estimated orientation and travel distance information to propagate the particle. In the weight update stage, the computed weighted likelihood is used. Likelihoods are computed at the RPs in the computation grid. While particles do not necessarily fall exactly on the RPs, each particle will take the likelihood value of its closest RP. Furthermore, if the particle violates the map constraints such as moving across a wall, the weight is set to 0. The weight is then normalized.

Given a set of N particles (($x_i$, $y_i$), $w_i$), the device location estimation step computes a device location by the weighted average of the positions of the particles as:

Equation 11

Finally, the resampling step corrects the set of samples based on the evidence. While more particles will be resampled in a region that has a higher probability density, some diversity is also added to the samples.

EXAMPLE

SiFu may be implemented in various hardware including computers equipped with signal sampling devices, mobile phones, tablets, or custom hardware that includes the signal sampling device, likelihood processor, and particle filter. The following experiment uses Android mobile phones to implement the SiFu system. For this example, four signals of widely different characteristics were selected: WiFi, magnetic field, GPS, and Google Fused Location API (which includes GPS, if any). Using these signals as examples, the example demonstrates their application in the inventive framework for multi-modal localization. However, the present invention is not limited to these signals, and may be equally and simply extended to other signals. The example was performed in three areas, an indoor corridor, an indoor open-space area and a semi-indoor atrium area in a university campus. The example demonstrates that SiFu is highly accurate in localization, improving substantially the accuracy as compared with other localization techniques (by more than 30%). By demonstrating an indoor and outdoor transition, it is proven that the SiFu system can manage an arbitrary combination of signals to achieve seamless roaming without switching algorithms between outdoors and indoors.

There are 91 APs in the corridor area covering a few long corridors, 93 APs in the 6010 $m^2$ indoor open space area and 103 APs in the 6824 $m^2$ atrium area.

In the atrium area, the ability of the system to handle arbitrary combinations of signals is tested. In some regions GPS is available and some regions are WiFi and magnetic fingerprint regions. In the experiment, the device moves from fingerprint region to non-fingerprint region such that the set of signals used switches from WiFi, magnetic and Google API to GPS and Google API. An In/Out Region Detection module is trained to detect whether a WiFi signal is observed within the fingerprint region in the online phase. If so, it is used it for location estimation. Otherwise, it is discarded.

The parameter settings in the Example are shown in Table II. The sampling frequency is around one sample every few seconds for WiFi signals and tens of samples every second for magnetic field and other INS sensors. Furthermore, Google Fused Location API returns a location every few seconds while the sampling rate of GPS is generally faster.

TABLE II

Default parameters.

| Parameter | Default value |
|---|---|
| Grid size | 1.5 m |
| N | 1,000 |
| d | 32 |
| L | 3 |
| r | 9 m |
| $\sigma_w$ | 5 |
| $\sigma_m$ | 10,000 |

In the Example, the present invention is compared to two prior art localization algorithms and Google API as well as a naive version of the present system.

WiDeep: This localization scheme applies stacked denoising autoencoders to denoise WiFi RSSI. For every reference point, an autoencoder is trained correspondingly. User location is estimated by selecting the point whose autoencoder recovers a WiFi RSSI reading the best. Noisy training readings are simulated by noise injector which assumes Gaussian distribution on environment noise.

F-Score-Weighted (FSW): This localization scheme measures weight of WiFi and magnetic field through F-score. Location is estimated by minimizing the weighted sum of log likelihoods of two signals. Signal likelihood is calculated by Gaussian probability density function.

Naive version of SiFu: This localization scheme uses the same set of signals as SiFu, namely, WiFi, magnetic field, GPS and Google to compute likelihoods, and then fuses with INS signals using a particle filter. In the naive version, signals are not weighted. The joint measurement likelihood is computed only by multiplying all the likelihoods together.

Google Fused Location API: A fusion localization algorithm created by Google that intelligently combines signals including WiFi, Bluetooth and GP S. The following performance metrics are for comparison:

Localization error: Localization error is the Euclidean distance between the estimated location and the ground truth. It is the most direct and common metric to measure the overall performance of localization systems. Error distributions are examined for a more comprehensive evaluation.

Computation time: Computation efficiency is of great importance for localization systems, especially for real-time systems. In this Example, the average time required to compute the location is measured after signals have been received.

Figure 5:
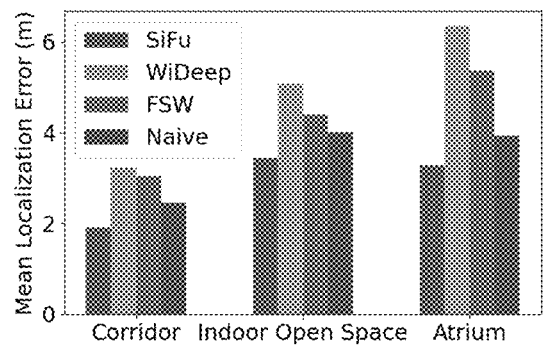
FIG. 5 is a plot of the mean error of different localization schemes at different sites.

The likelihood computation module is first validated for spot-based RSSI vectors. The model used in the present invention which computes based on the distance in the latent space is compared with the other schemes that are based on different metrics, such as Euclidean distance and cosine similarity, in the raw signal readings. FIG. 5 shows the comparison between different sites. The SiFu system of the present invention performs more accurately in all three sites. In the corridor area, the three comparison schemes perform almost the same, probably because WiFi signals there are stronger and more stable. However, when tested in more open areas like the indoor open space and atrium, the multi-path fading effect becomes much stronger and WiFi signals may fluctuate greatly. Naive methods such as comparing the Euclidean distance and cosine similarity in the raw signal space are evidently affected. Instead, the system of the present invention has already learned to adapt the signal noise and missing values in the training phase and is thus more robust and achieves superior accuracy over the other systems.

For fusion localization, FIG. 5 plots the mean localization error of SiFu and the compared schemes over three test sites. SiFu demonstrates improved accuracy over the prior art algorithms in all three sites. For WiDeep, the performance is reasonable in the corridor area but in the indoor open space and atrium regions, its accuracy and stability suffer critically due to the noisy WiFi measurements in open areas. As WiDeep only considers a single signal for localization, it does not perform well in regions with weak and unstable WiFi signals. In contrast, FSW fuses geomagnetism with WiFi. The negative effects of poor WiFi signals in the open areas may be mitigated by the magnetic field, thus it generally works better than WiDeep. However, its fusion method is not ideal as the F-score it introduces does not consider the intrinsic localization errors in complex environments. SiFu improves accuracy over the prior art by fusing more signals and adopting a better fusion approach. Fusing more signals allows the SiFu system to have greater information to make decisions and further introducing INS signals and the particle filter stabilizes the localization results. Furthermore, compared with the naive version of the present invention, SiFu takes advantage of the weighted likelihood scheme that alleviates the impacts of bad model performance in some areas, resulting in an even lower localization error. The SiFu system achieves the best mean localization error among the comparison schemes. The mean errors are cut by more than 30% as compared to prior art systems.

Figure 6A:
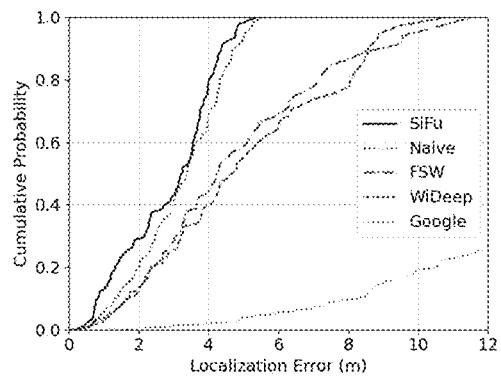
FIGS. 6A-6C show the cumulative distribution of localization errors at different sites.
Figure 6B:
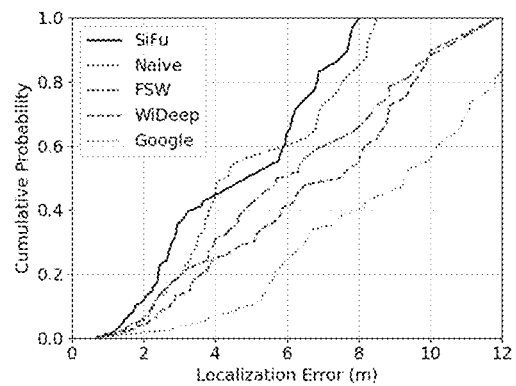
Figure 6C:
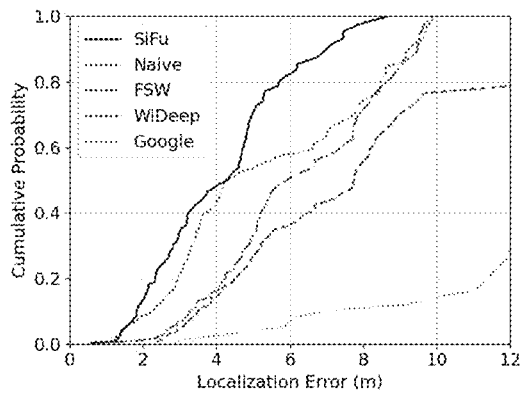

FIG. 6 plots the cumulative distribution function of the localization errors in different test sites. It is clear that the SiFu system achieves the most stable and robust performance among all compared schemes. The maximum errors are reduced significantly and a large portion of the results have acceptable localization errors in all three sites. In FIG. 6A, the performance of SiFu and its naive version is observed to be close. This suggests that the weighted fusion method does not play an important role in the corridor region. This may be because individual models have already worked well and the weight only has limited effects on the shape of the likelihood function. This can also explain why FSW and WiDeep can achieve reasonable accuracy in this site. FIG. 6B shows some slight impact of the weighted likelihood. The maximum error is reduced while several more results have lower localization errors than the naive version. Furthermore, as shown in FIG. 6C, the impact of the likelihood fusion method is the most significant. While there are still a number of results with average accuracy using the naive version, SiFu substantially reduces the error. In the atrium region, the WiFi signals may not be ideal for localization as both the localization error and maximum error are large for WiDeep.

Figure 7A:
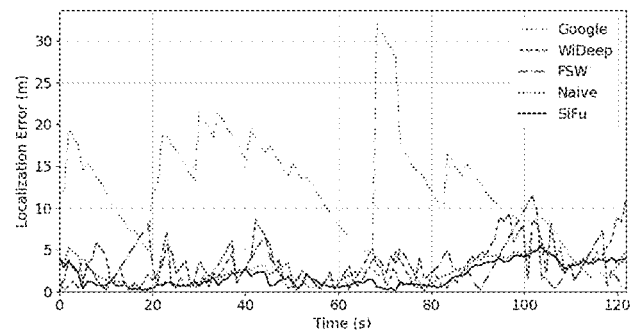
FIGS. 7A-7C show real-time localization errors at different sites.
Figure 7B:
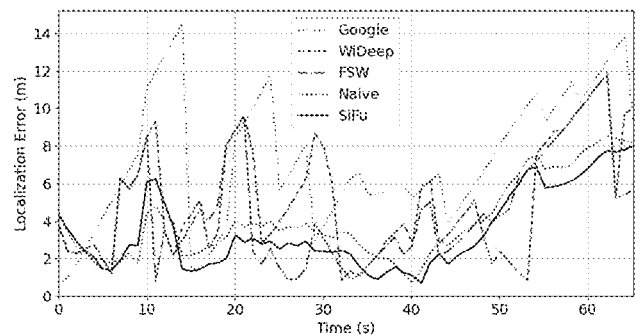

In FIG. 7, the real-time performance of the compared schemes is plotted for different sites. SiFu, which is drawn using a solid line, generally achieves stable and satisfactory performance. The error remains consistently low and, importantly, does not exhibit large fluctuations. Being a general localization solution, the Google Fused Location API is not specifically engineered for the Example testing sites. Hence it is expected that the localization performance is not as good as the other compared schemes requiring site survey. The results also show high levels of variation seriously which undermines user experience. FIG. 7A indicates similar performance from the prior art methods in the corridor region. All methods attain generally low errors with acceptable fluctuations. In indoor open space, FIG. 7B, the results are relatively worse. The localization errors increase considerably near the end of the walk. However, compared with other works, SiFu still achieves the most accurate and stable results.

Figure 7C:
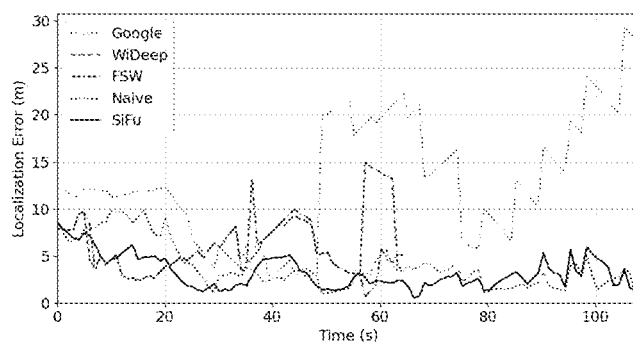

Additionally, we observe a smooth transition from fingerprint region to non-fingerprint region in the atrium area as shown in FIG. 7C. Despite the fact that the signals used for localization change, the localization performance is sufficiently steady such that this transition is unnoticeable. This substantiates the ability of SiFu to handle arbitrary signal combinations.

Figure 8A:
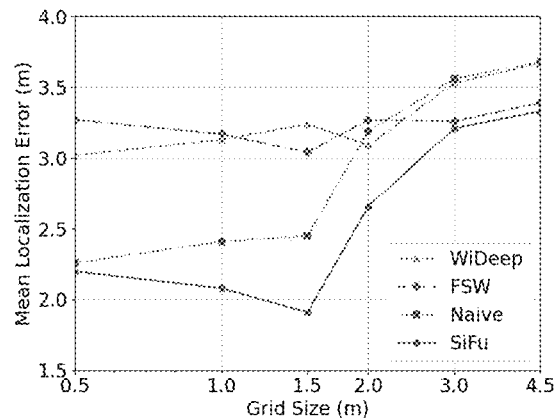
FIGS. 8A-8C show mean localization error at different sites with different sizes of computation grids.
Figure 8B:
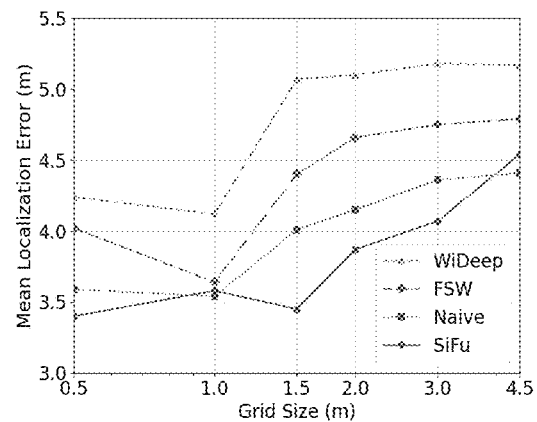
Figure 8C:
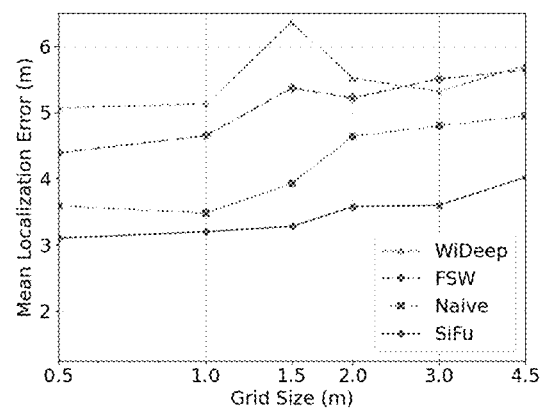

Furthermore, the impacts of different parameters in the SiFu system on the localization performance and computation efficiency are investigated. The size of the grid used for computing likelihoods is defined as the distance between adjacent grid points. FIG. 8A, FIG. 8B, and FIG. 8C plot the mean localization errors with different grid sizes in the corridor region, indoor open space and atrium, respectively. Overall, it is found that the mean localization increases as the grid size increases. Each reference point in the computation grid is associated with a fingerprint signal. The likelihood computed with the fingerprint signal aims to cover the neighboring region. When the grid size is large, the fingerprint signals may not accurately reflect the signals that can be sampled within the neighborhood of the grid. Eventually, the likelihood computation would become incorrect. In contrast, a denser grid contains more reference points associated with fingerprint signals. This possibly allows better signal differentiation. For example, in the particle filter, particles nearby can have distinct likelihoods when the grid size is small, leading to a more precise distribution.

Figure 9:
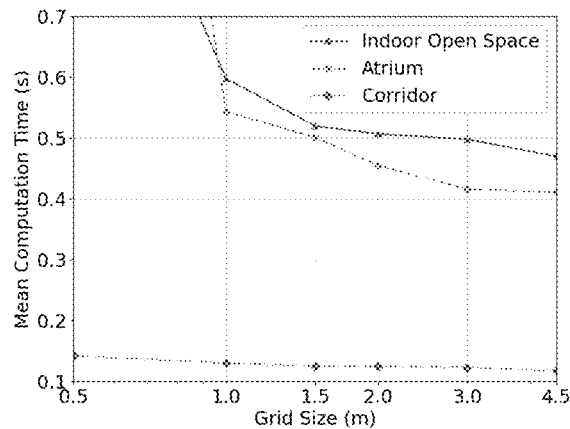
FIG. 9 depicts computation time with different grid sizes.

The effect of grid size on the computation efficiency is plotted in FIG. 9. A decreasing trend of computation time with increasing grid size is observed. It is reasonable because a sparse grid means that likelihoods have to be computed at fewer reference points, and hence less computation is required. Consequently, higher accuracy with smaller grid size comes with a trade-off, which is computation efficiency. Furthermore, the results show that the computation complexity of the SiFu system is not high, so that the system can be easily deployed as a real-time localization system. Even in larger sites, the computation time will not grow significantly when the magnetic field matching space is limited and each module does not require expensive computation.

Figure 10:
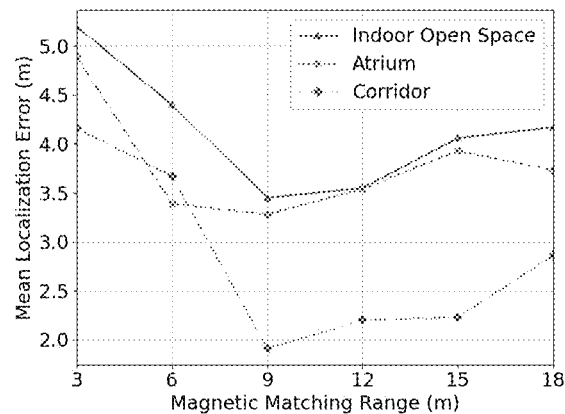
FIG. 10 depicts mean localization error at different sites with different magnetic field matching ranges.

In FIG. 10, the mean localization errors in different sites with different magnetic matching ranges are shown. A V-shape can be observed from the plot where the localization error becomes larger when the range is too small or too large. As the magnetic matching space is limited by the last predicted location, which is merely an approximate of the true last device/user location, the true current locations may not be covered in the matching space when the range is too small. Therefore, the magnetic field at the true location will be ignored in the sequence matching procedure and the result will not be valid. On the other hand, if the range is too large, ambiguity in magnetic sequences within the matching region may exist, which makes the likelihood computation inaccurate. In this Example, the optimal range is around 9 m, which can accommodate the localization error while limiting ambiguity in the search space.

Figure 11:
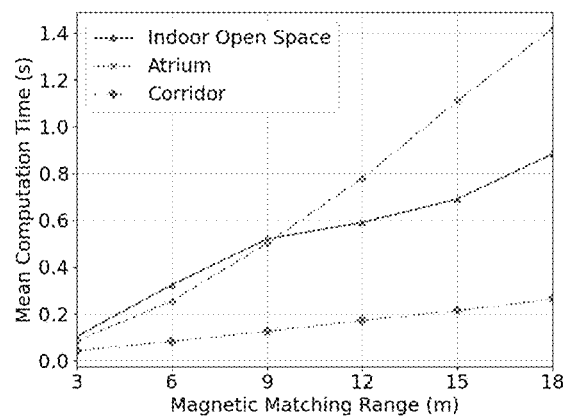
FIG. 11 depicts computation time with different magnetic field matching ranges.

FIG. 11 plots the mean computation time with different magnetic field matching range. A linearly increasing trend in computation time is observed as the matching range increases. It suggests that the DTW algorithm for magnetic field localization in the SiFu system is rather expensive. When the matching space is large and there is a need to match against more magnetic field fingerprints, the computation time increases dramatically. To make the SiFu system operable in real-time, the range should be limited appropriately. Considering the localization accuracy, the default is set to 9 m.

Figure 12:
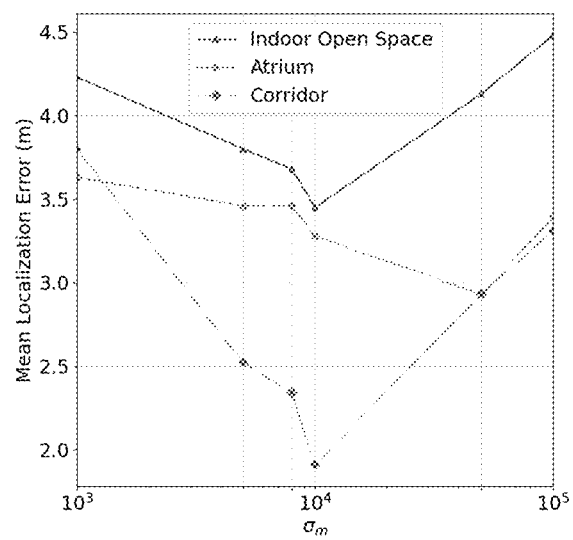
FIG. 12 shows mean localization error at different sites with different $\sigma_m$.

FIG. 12 plots the mean localization errors in different sites with different $\sigma_m$. A V-shape is observed. The sensitivity parameter $\sigma_m$ for the observation model for magnetic field decides how much noise can be tolerated. If it is too large, the likelihood cannot effectively discriminate locations because dissimilar signals will still get a rather high likelihood. If it is too small, the likelihood will be low even if the sampled signal deviates a bit from the fingerprint signal. As the noise tolerance is low, signal noise cannot be handled properly. This implies that the sensitivity parameter $\sigma_m$ cannot be too large or too small in order to obtain a legitimate location estimate.

Figure 13:
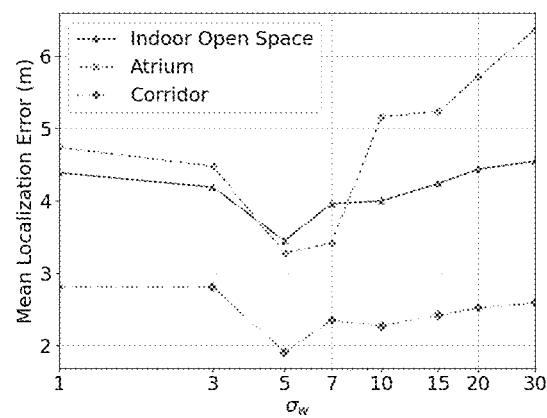
FIG. 13 shows mean localization error at different sites with different $\sigma_w$.

Further, the impact of $\sigma_w$ on the localization performance in different sites is demonstrated in FIG. 13. A similar V-shape can be observed. This reinforces the results in the experiment for am. Indeed, $\sigma_m$ and $\sigma_w$ are two important parameters in the SiFu system and the results explain the default settings of these two parameters.

Figure 14:
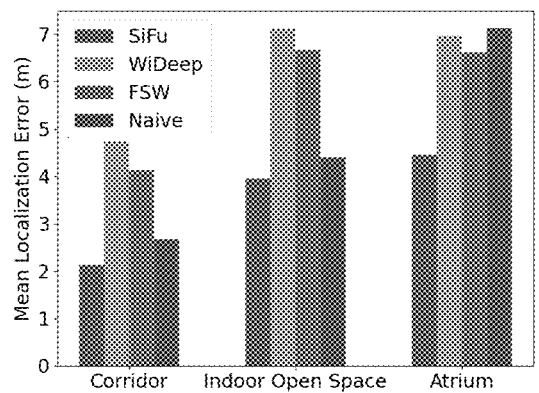
FIG. 14 depicts the mean error of different localization schemes at different sites with sparse WiFi sampling.

Finally, the localization performance with sparse WiFi sampling is determined. FIG. 14 shows the mean errors of SiFu and the compared schemes in different test sites. The results are consistent with the dense WiFi sampling results. With sparser WiFi sampling, it can be observed that the mean errors generally increase compared to the situation where dense WiFi signals are available. The increase of the error of SiFu is much lower than that of the compared prior art schemes. It remains the best localization system among the compared schemes. Furthermore, it is again noted that the weighted scheme in SiFu boosts the localization performance over the naive version of SiFu.

Figure 15A:
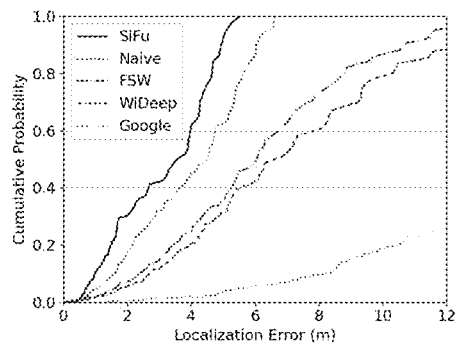
FIG. 15A-15C shows the cumulative distribution of localization errors at different sites with sparse WiFi sampling.
Figure 15B:
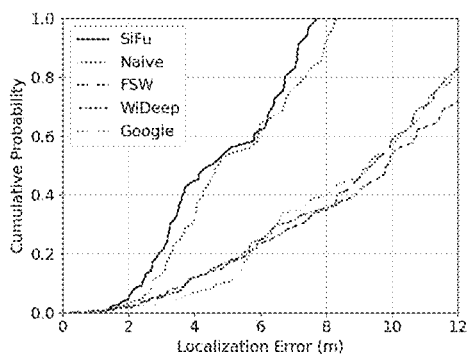
Figure 15C:
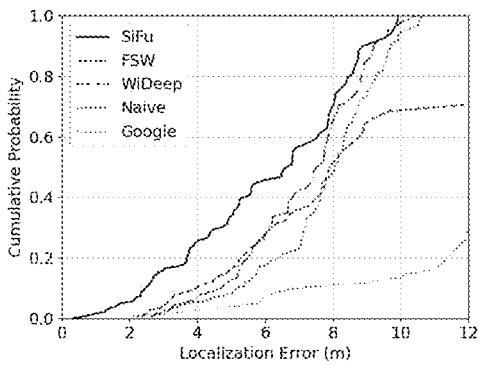

FIGS. 15A, 15B, and 15C plot the cumulative distribution of the localization errors in different sites in the sparse WiFi sampling case. WiDeep that uses only WiFi performs poorly as WiFi signals are less frequently available for localization. FSW, despite also considering magnetic field, only performs slightly better than WiDeep. This is probably because it does not work when some signals, such as WiFi in this case, are unavailable. When the WiFi signal is unavailable, using only the magnetic field may not give an acceptable performance due to the ambiguity of the magnetic field. In contrast, SiFu fuses more signals and integrates INS signals. Device/user location can still be approximated accurately even though some signals are missing. Similar to the dense WiFi sampling case, a majority of the results has satisfactory localization error.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A probabilistic system fusing an arbitrary combination of heterogeneous signals for determining the location of electronic devices, comprising:
    a signal sampling device for detecting one or more signals emitted by an electronic device to be located, the one or more emitted signals selected from one or more of geolocation signals, WiFi signals, Bluetooth signals, 4G communication signals, 5G communication signals, geomagnetism signals, or inertial navigation system signals (INS), the signal sampling device using heterogeneous sampling rates for each of the selected signals;
    a likelihood processor cooperating with the signal sampling device for receiving information about selected sampled signals;
    wherein the likelihood processor is configured to:
        create a grid of reference points for an interested area in which the electronic device may be located;
        compute, for each selected sampled signal, a location likelihood that is a probability of observing the sampled signal given that the electronic device is located at different reference points in the grid and fusing the location likelihoods for plural signals in a weighted fashion;

wherein the likelihood processor comprises a likelihood fusion module for assigning weights to contrast the location likelihoods; and wherein contribution of an extreme signal of the plural signals, which is weighted as zero, is removed such that decision power is shifted to the plural signals other than the extreme signal;

wherein the probabilistic system further comprises a particle filter using weighted location likelihoods from the likelihood fusion module to update a particle weight in the particle filter to determine the location of the electronic device.

2. The probabilistic system fusing an arbitrary combination of heterogeneous signals for determining the location of electronic devices according to claim 1, wherein the likelihood processor includes a neural network for processing RSSI vector-based signals.

3. The probabilistic system fusing an arbitrary combination of heterogeneous signals for determining the location of electronic devices according to claim 1, wherein the likelihood processor includes a Bayesian analysis module for determining the likelihood location of geolocation signals.

4. The probabilistic system fusing an arbitrary combination of heterogeneous signals for determining the location of electronic devices according to claim 1, wherein the likelihood processor includes a dynamic time warping module for analysis of sequence-based signals.

5. A localization method fusing an arbitrary combination of heterogeneous signals for determining the location of electronic devices, comprising:

heterogeneously sampling one or more signals emitted from an electronic device to be located, the one or more signals selected from one or more of geolocation signals, WiFi signals, Bluetooth signals, 4G communication signals, 5G communication signals, geomagnetism signals, or inertial navigation system signals (INS);

feeding sampled signal information to a likelihood processor cooperating with the signal sampling device, the likelihood processor creating a grid of reference points for an interested area in which the electronic device may be located;

wherein the likelihood processor is configured to compute, for each selected sampled signal, a location likelihood that is a probability of observing the sampled signal given that the electronic device is located at different reference points in the grid and fusing the location likelihoods for plural sampled signals in a weighted fashion;

wherein the likelihood processor comprises a likelihood fusion module for assigning weights to contrast the location likelihoods;

wherein contribution of an extreme signal of the plural signals, which is weighted as zero, is removed such that decision power is shifted to the plural signals other than the extreme signal; and wherein the method dynamically drops a sampled signal when the sampled signal is not observed at a localization time;

wherein the localization method further comprises using a particle filter to dynamically combine weighted location likelihoods from the likelihood fusion module to update a particle weight in the particle filter to determine the location of the electronic device.

6. The localization method fusing an arbitrary combination of heterogeneous signals for determining the location of electronic devices according to claim 5, wherein the likelihood processor includes a neural network for processing RSSI vector-based signals.

7. The localization method fusing an arbitrary combination of heterogeneous signals for determining the location of electronic devices according to claim 5, wherein the likelihood processor includes a Bayesian analysis module for determining the likelihood location of geolocation signals.

8. The localization method fusing an arbitrary combination of heterogeneous signals for determining the location of electronic devices according to claim 5, wherein the likelihood processor includes a dynamic time warping module for analysis of sequence-based signals.

\* \* \* \* \*